US009126238B2

(12) United States Patent
Quinn

(10) Patent No.: US 9,126,238 B2
(45) Date of Patent: Sep. 8, 2015

(54) VEHICLE SNOW REMOVAL SYSTEM

(75) Inventor: James D. Quinn, Waterford (CA)

(73) Assignee: Diane Quinn, Waterford, Ontario (CA)

( * ) Notice: Subject to any disclaimer, the term of this patent is extended or adjusted under 35 U.S.C. 154(b) by 441 days.

(21) Appl. No.: 12/969,009

(22) Filed: Dec. 15, 2010

(65) Prior Publication Data
US 2012/0152291 A1 Jun. 21, 2012

(51) Int. Cl.
*A47L 5/00* (2006.01)
*B08B 1/00* (2006.01)
*B60S 3/04* (2006.01)

(52) U.S. Cl.
CPC .. *B08B 1/008* (2013.01); *B60S 3/04* (2013.01)

(58) Field of Classification Search
USPC ............ 15/316.1, 312.1, 405, 319, 339, 53.1, 15/53.2; 134/19, 123
See application file for complete search history.

(56) References Cited

U.S. PATENT DOCUMENTS

| 3,800,858 | A | | 4/1974 | Placek |
| 4,256,944 | A | | 3/1981 | Brandon |
| 4,370,534 | A | | 1/1983 | Brandon |
| 4,683,870 | A | | 8/1987 | Bjorklund |
| 4,949,423 | A | | 8/1990 | Larson et al. |
| 5,755,043 | A | * | 5/1998 | Belanger et al. ................ 34/666 |
| 5,802,654 | A | * | 9/1998 | Yeaglin .......................... 15/97.3 |
| 5,857,646 | A | | 1/1999 | Taricco |
| 5,989,356 | A | | 11/1999 | Candeletti |
| 6,453,500 | B1 | | 9/2002 | Schmitt |
| 6,530,115 | B2 | * | 3/2003 | MacNeil ...................... 15/316.1 |
| 6,654,978 | B2 | | 12/2003 | Bouchard |
| 6,735,884 | B2 | * | 5/2004 | Fratello et al. .................. 34/487 |
| 6,843,455 | B1 | * | 1/2005 | Wentworth et al. ........ 248/200.1 |
| 7,346,956 | B2 | | 3/2008 | Andre |
| 7,562,413 | B2 | * | 7/2009 | Martin et al. .................. 15/97.3 |
| 7,617,561 | B2 | | 11/2009 | Couture |
| 2007/0074357 | A1 | | 4/2007 | Reed |
| 2010/0059089 | A1 | * | 3/2010 | Opdyke .......................... 134/37 |

FOREIGN PATENT DOCUMENTS

JP 2000-80622 3/2000

* cited by examiner

*Primary Examiner* — Dung Van Nguyen
(74) *Attorney, Agent, or Firm* — Richard C. Litman

(57) ABSTRACT

The vehicle snow removal system is a drive-through station for clearing snow, ice, or other debris from a flat surface of a vehicle, such as the vehicle's roof, for example. The vehicle snow removal system includes a pair of vertical supports, each having an upper end and a lower end. The lower ends thereof are adapted for mounting on a support surface. The pair of vertical supports are laterally spaced apart from one another such that the vehicle may drive therebetween. Opposed ends of a horizontal support are mounted on respective upper ends of the vertical supports. At least one blower is mounted substantially centrally on the horizontal support, and the vertical supports each have sufficient height to provide clearance for the roof of the vehicle. The at least one blower may be actuated either automatically or manually to blow accumulated snow from the flat surface of the vehicle.

15 Claims, 4 Drawing Sheets

VEHICLE SNOW REMOVAL SYSTEM

BACKGROUND OF THE INVENTION

1. Field of the Invention

The present invention relates to the removal of snow, ice, and other debris from vehicles, and particularly to a vehicle snow removal system for removing snow, ice and other debris from a flat surface of a vehicle.

2. Description of the Related Art

Snow, ice and other debris commonly accumulate on flat vehicle surfaces. Not only does such accumulation increase the overall weight of the vehicle, thus decreasing efficiency, but it must be removed in order to prevent hazards to other drivers. When the vehicle is driven, the ice, snow, and other debris may fly from the vehicle surface and land on the road behind the vehicle, or upon another vehicle, thus creating dangerous conditions.

Due to decreases in efficiency, the necessity of clearing cargo space, and the potential hazards caused by these weather-related conditions, the clearing of snow, ice, and debris is of considerable interest in the trucking and bus industries. Trucking companies and bus lines spend considerable amounts of time and money clearing snow and ice from vehicles after every snowstorm. Due to the great effort involved, operation of the trucks or buses of a large fleet can be delayed significantly after a snowstorm. Furthermore, since snow and ice removal is typically performed manually by workers shoveling from atop the truck bed or bus roof, there is a significant hazard for the workers, who may slip and fall from the raised bed or roof. Thus, a vehicle snow removal system solving the aforementioned problems is desired.

SUMMARY OF THE INVENTION

The vehicle snow removal system is a drive-through station for clearing snow, ice, or other debris from a flat surface of a vehicle, such as the vehicle's roof, for example. The vehicle snow removal system includes a pair of vertical supports, each having an upper end and a lower end. The lower ends thereof are adapted for mounting on a support surface, such as the ground. The pair of vertical supports are laterally spaced apart from one another such that the vehicle may drive therebetween.

A horizontal support is further provided, with the horizontal support having a pair of laterally opposed ends. Each end is mounted on a respective upper end of one of the vertical supports. At least one blower is mounted substantially centrally on the horizontal support, and the vertical supports each have sufficient height such that the at least one blower may blow downwardly on the roof of the vehicle. The at least one blower may be actuated either automatically or manually to blow accumulated snow from the flat surface of the vehicle.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
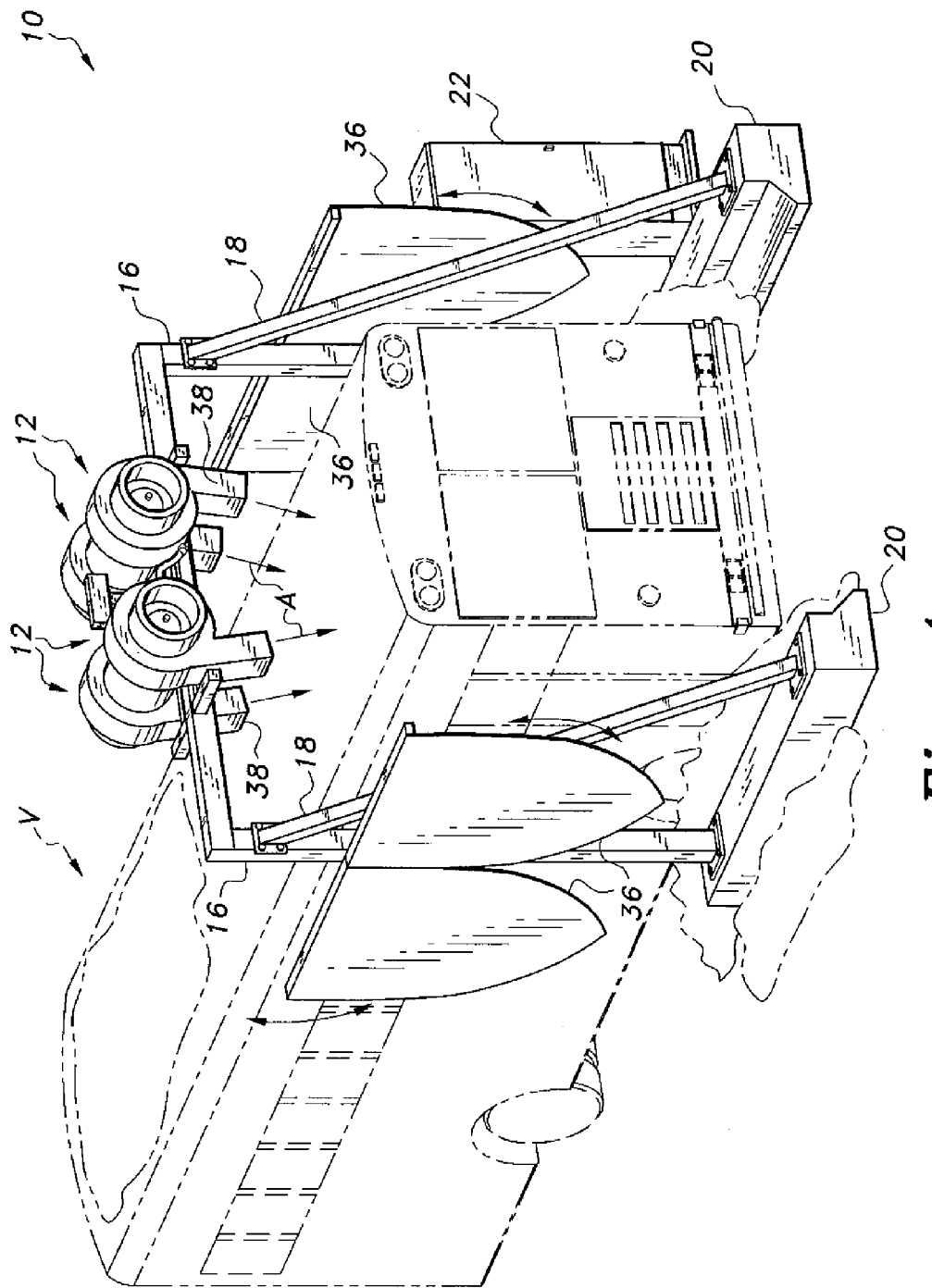
FIG. 1 is an environmental, perspective view of a vehicle snow removal system according to the present invention.
Figure 2:
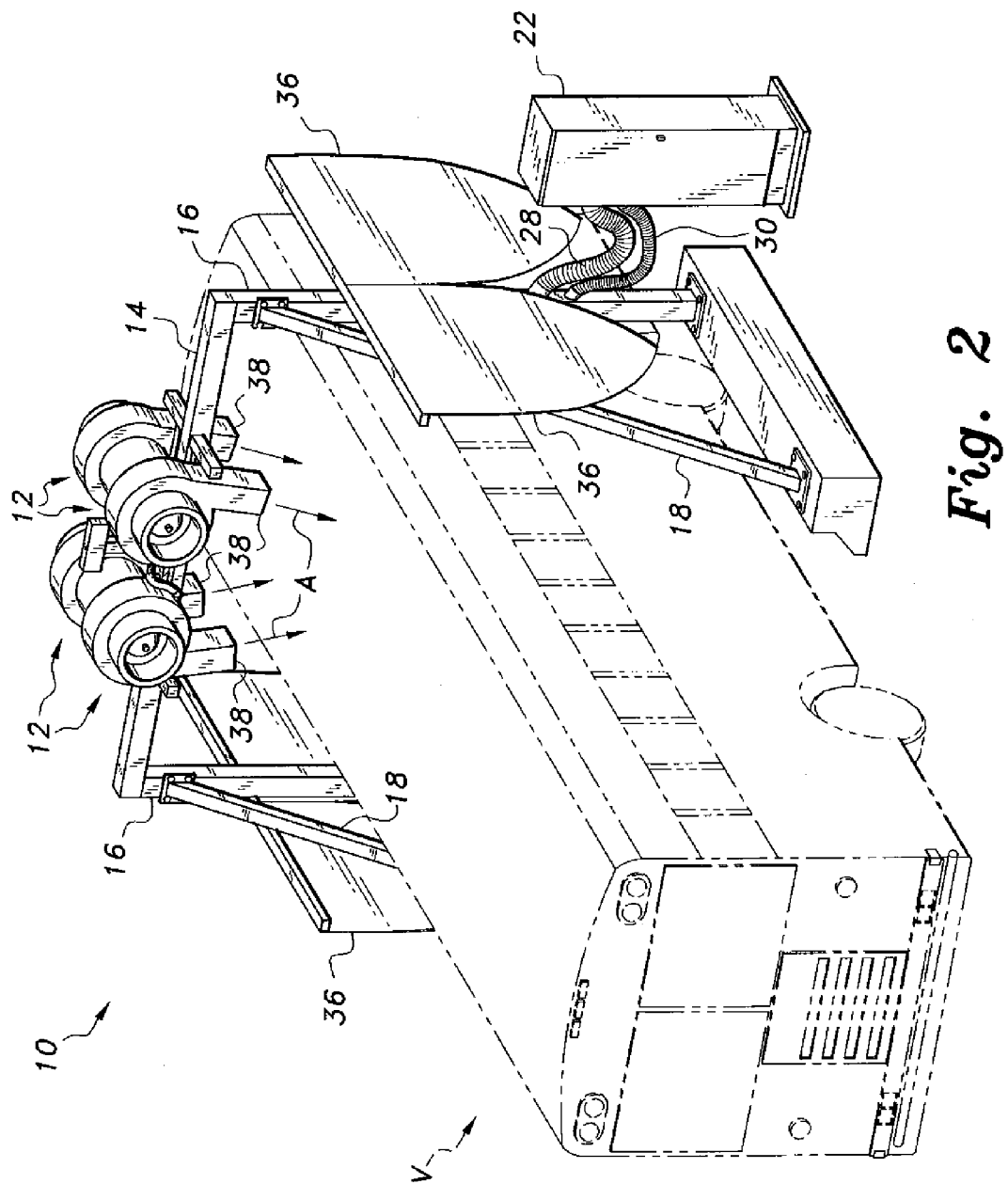
FIG. 2 is an environmental, perspective view of the vehicle snow removal system according to the present invention.

Referring to FIGS. 1-4, the vehicle snow removal system 10 is a drive-through station for clearing snow, ice, or other debris from a flat surface of a vehicle V, such as the vehicle's roof. It should be understood that the bus illustrated in FIGS. 1 and 2 is shown for exemplary purposes only. The vehicle snow removal system 10 includes a pair of vertical supports 16, each having an upper end and a lower end. The lower ends thereof are adapted for mounting on a support surface, such as the ground. The pair of vertical supports 16 are laterally spaced apart from one another such that the vehicle V may drive therebetween. As best shown in FIGS. 1 and 2, a pair of mounts 20 may be provided, with the lower ends of the vertical supports 16 being embedded therein for stability. Further, additional struts 18 may be provided, as shown, for additional structural stability.

As shown, a horizontal support 14 is additionally provided, with the horizontal support 14 having a pair of laterally opposed ends. Each end thereof is mounted on a respective upper end of one of the vertical supports 16. At least one blower 12 is mounted substantially centrally on the horizontal support 14, and the vertical supports 16 each have sufficient height such that the at least one blower 12 may blow downwardly on the roof of the vehicle V without contacting the roof. For example, vertical supports 16 may be separated by a distance of approximately twelve feet, and horizontal support 14 may be spaced approximately fourteen feet from the ground.

Figure 4:
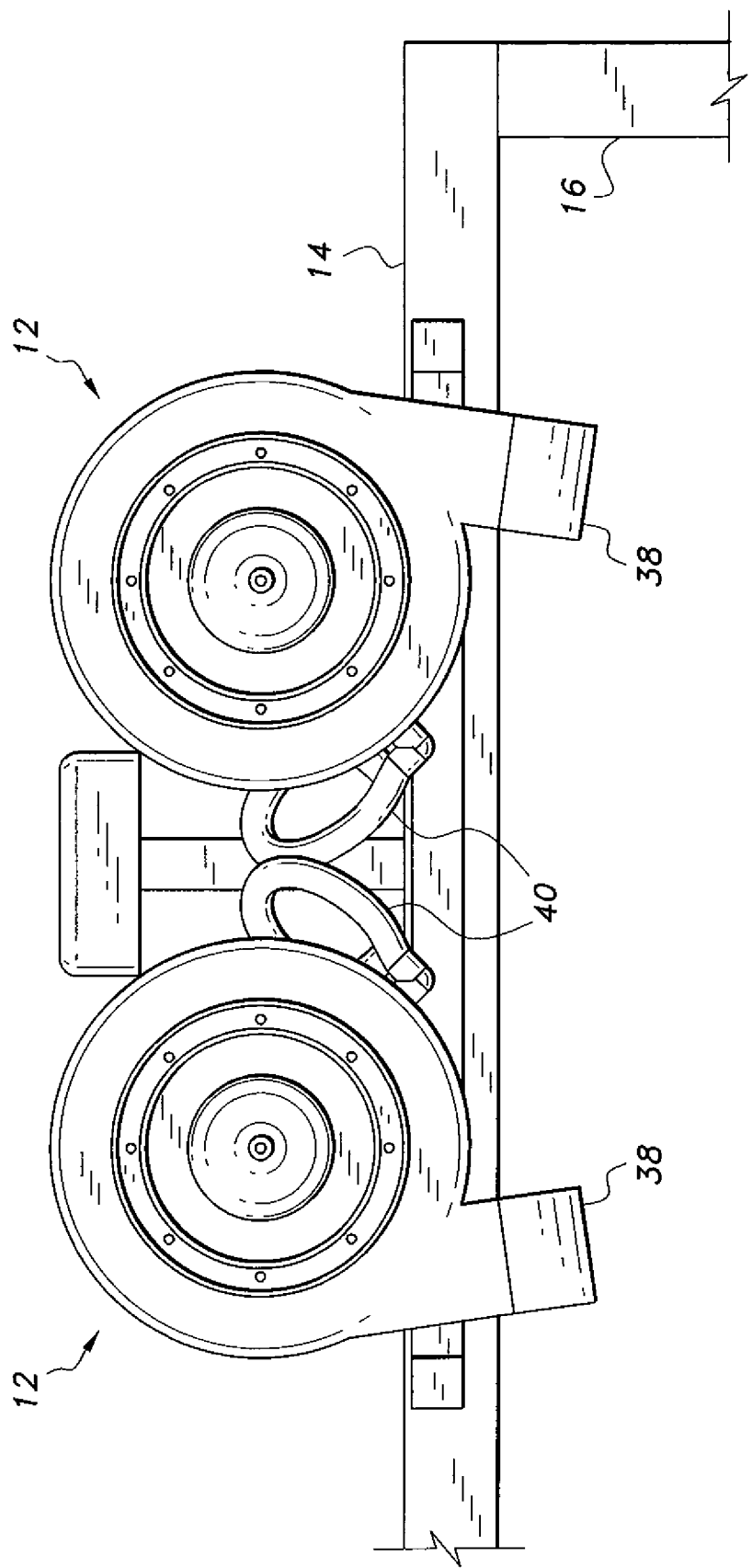
FIG. 4 is a partial front view of the vehicle snow removal system, illustrating blowers thereof.

The at least one blower 12 may be actuated either automatically or manually to blow accumulated snow from the flat surface of the vehicle V, as will be described in greater detail below. In the Figures, four such blowers 12 are shown, although it should be understood that any desired number of blowers 12 may be utilized. As shown in FIG. 4, the exhaust port 38 of each blower 12 is angularly positioned to blow air A onto the vehicle's roof or onto any other desired flat surface of vehicle V.

The pair of vertical supports 16, the horizontal support 14, and struts 18 may be formed of any suitable material and may have any desired contouring or dimensions. As an example, vertical supports 16 and horizontal support 14 may be formed from steel or the like, and may have cross-sectional dimensions of approximately eight inches by 8¼ inches. Mounts 20 may be formed of concrete or the like and are provided with sufficient mass so as to prevent accidental dislodgement thereof. For example, each mount 20 may be in the form of a concrete block having a length of approximately nine feet and five inches, a height of approximately two feet and a width of approximately two feet, thus having a weight of approximately 7,900 pounds. This weight is provided for preventing accidental movement thereof should system 10 be accidentally hit by vehicle V.

Figure 3:
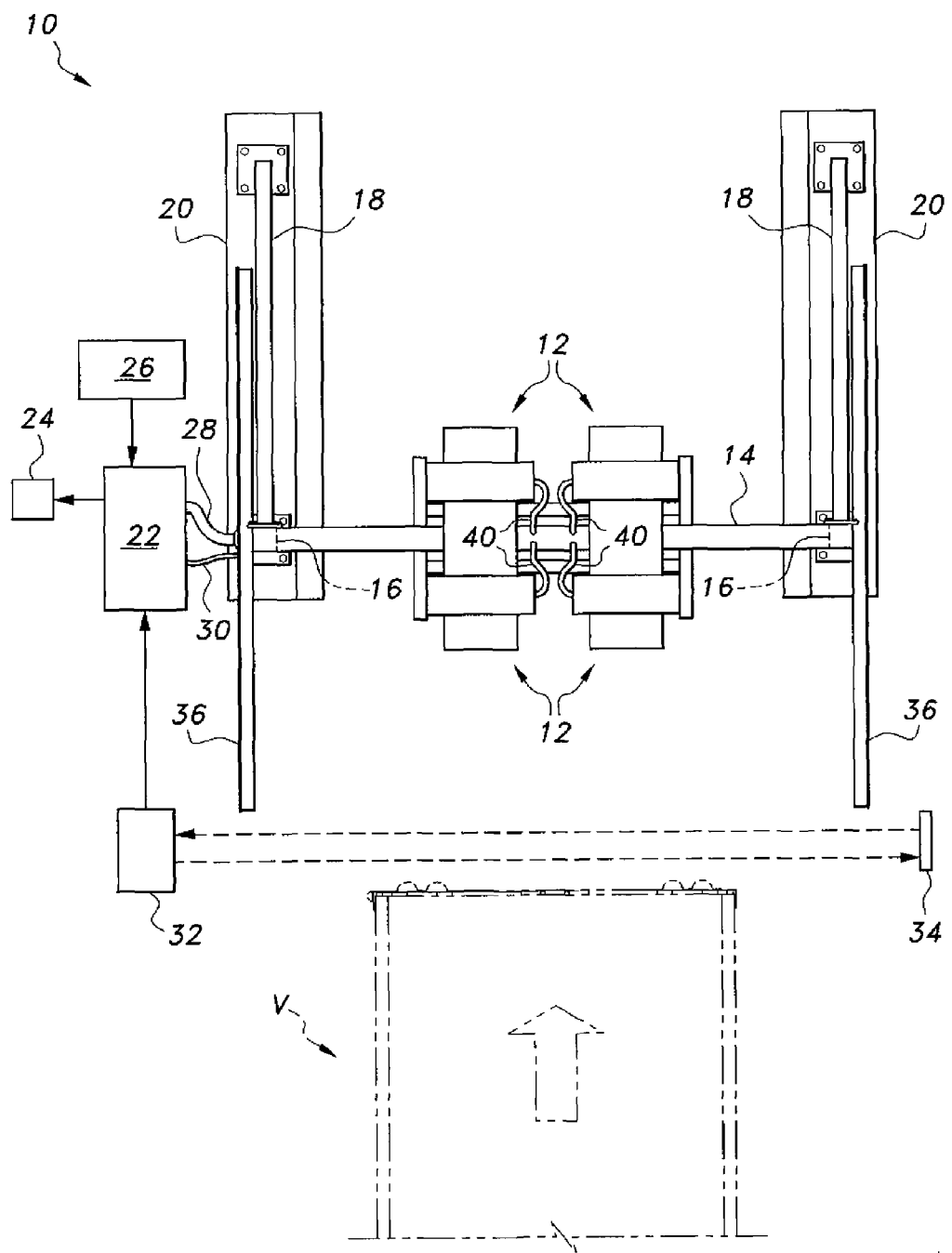
FIG. 3 is a top, partially diagrammatic view of the vehicle snow removal system according to the present invention.

Preferably, a heater 26 is associated with the at least one blower 12 to prevent cold damage thereto. As shown in FIG. 3, heater 26 may be provided externally with actuation thereof being controlled by controller 22. It should be understood that any suitable type of heater may be utilized. Controller 22 may be any suitable type of controller for controlling power delivered to the at least one blower 12 (delivered by power line 30, as shown in FIG. 3, linking controller 22 and the at least one blower 12) and for actuating heater 26. As will be described in greater detail below, controller 22 may be a manual controller or may automatically actuate the at least one blower 12 upon detection of vehicle V. Upon actuation of the at least one blower 12 by controller 22, the heater 26 generates heated air which is delivered to the motor of the at least one blower 12 via hose 28.

For systems with multiple blowers 12 (such as that shown in the example of FIGS. 1-4), controller 22 may actuate each blower 12 individually, in sequence, in order to reduce overall power consumption. It should be understood that any suitable type of blower may be utilized. Preferably, each blower 12 is substantially waterproof and the heated air generated by heater 26 is distributed throughout the motors of all blowers 12 equally. Preferably, heater 26 also heats controller 22. Controller 22 preferably includes a waterproof housing and may be any suitable type of controller. Preferably, controller 22 includes one contactor for each blower 12, with associated safety components, such as fuses, breakers and the like.

In the preferred embodiment, the pair of vertical supports 16 and the horizontal support 14 are each hollow, with the interiors thereof being in communication with one another. The heater 26 delivers heated air within the respective interiors of the pair of vertical supports 16 and the horizontal support 14, via hose 28. The motor of the at least one blower 12 is in fluid communication with the interior of said horizontal support 14 via hose 40 (shown in FIG. 4) for receiving the heated air. It should be noted that the heated air is not provided for melting the snow or ice, but to heat the blower 12 itself, thus preventing possible damage thereto from the cold.

At least one shield 36 is preferably mounted to the pair of vertical supports 16 to block snow blown from the flat surface of the vehicle V. Preferably, a pair of shields 36 are provided, as shown, with each shield 36 being mounted to a respective one of the vertical supports 16. As indicated by the directional arrows in FIG. 1, shields 36 are preferably pivotally mounted to the vertical supports 16, allowing for selective angular adjustment thereof. It should be understood that shields 36 may have any desired size or shape, and are shown for exemplary purposes only in FIGS. 1 and 2.

As shown in FIG. 3, a conventional electric eye 32 may be provided for generating an light beam, which, ordinarily, is reflected back by reflector 34. Such optical sensors are well known in the art and any suitable type of optical sensor may be utilized. When vehicle V blocks the light beam reflected by reflector 34, electric eye 32 generates a signal which is delivered to controller 30, which actuates the at least one blower 12 (and heater 26). It should be understood that any suitable type of switching mechanism may be utilized to actuate the at least one blower 12, including weight sensors or the like, or a manual switch associated with controller 30.

Additionally, an external alarm 24 may be in electrical communication with controller 30 for generating audio alarm signals, visual alarms signals or a combination thereof when the at least one blower 12 is actuated. Such an alert is provided to prevent workers and bystanders from being accidentally hit with debris blown off of vehicle V by the at least one blower 12.

It is to be understood that the present invention is not limited to the embodiments described above, but encompasses any and all embodiments within the scope of the following claims.

I claim:

1. A vehicle snow removal system, comprising:
   a pair of vertical supports, each of the supports having an upper end and a lower end, the lower ends being adapted for mounting on a support surface, the pair of vertical supports being laterally spaced apart from one another so that a vehicle may drive therebetween;
   a horizontal support having a pair of laterally opposed ends, each of the ends being mounted on the respective upper end of one of the vertical supports;
   at least one blower mounted substantially centrally on the horizontal support in order to be positioned to blow accumulated snow from a flat surface of the vehicle;
   means for heating said at least one blower to prevent cold damage thereto;
   means for actuating the at least one blower; and
   a heater, wherein the pair of vertical supports and the horizontal support are each hollow, the heater delivering heated air within respective interiors of the pair of vertical supports and the horizontal support, the blower being in fluid communication with the interior of the horizontal support.

2. The vehicle snow removal system as recited in claim 1, wherein said means for actuating said at least one blower comprises an optical sensor for detecting the vehicle's proximity.

3. The vehicle snow removal system as recited in claim 1, further comprising an alarm in communication with said means for actuating said at least one blower to provide an alert of the actuation of said at least blower.

4. The vehicle snow removal system as recited in claim 1, further comprising at least one shield mounted to the pair of vertical supports to block snow blown from the flat surface of the vehicle.

5. The vehicle snow removal system as recited in claim 4, wherein the at least one shield comprises a pair of shields, each said shield being mounted on a respective one of the pair of vertical supports.

6. The vehicle snow removal system as recited in claim 5, wherein each said shield is pivotally mounted on the respective one of the pair of vertical supports.

7. A vehicle snow removal system, comprising:
   a pair of vertical supports, each of the supports having an upper end and a lower end, the lower ends being adapted for mounting on a support surface, the pair of vertical supports being laterally spaced apart from one another so that a vehicle may drive therebetween;
   a horizontal support having a pair of laterally opposed ends, each of the ends being mounted on the respective upper end of one of the vertical supports;
   at least one blower mounted substantially centrally on the horizontal support in order to be positioned to blow accumulated snow from a flat surface of the vehicle;
   means for heating the at least one blower to prevent cold damage thereto;
   means for actuating the at least one blower; and
   at least one shield mounted to the pair of vertical supports to block snow blown from the flat surface of the vehicle.

8. The vehicle snow removal system as recited in claim 7, wherein said means for actuating said at least one blower comprises an optical sensor for detecting the vehicle's proximity.

9. The vehicle snow removal system as recited in claim 7, further comprising an alarm in communication with said means for actuating said at least one blower to provide an alert of the actuation of said at least blower.

10. The vehicle snow removal system as recited in claim 7, further comprising a heater, wherein said pair of vertical supports and said horizontal support are each hollow, the heater delivering heated air within respective interiors of said pair of vertical supports and said horizontal support, a motor of said at least one blower being in fluid communication with the interior of said horizontal support.

11. The vehicle snow removal system as recited in claim 7 wherein the at least one shield comprises a pair of shields, each said shield being mounted on a respective one of the pair of vertical supports.

12. The vehicle snow removal system as recited in claim 11, wherein each said shield is pivotally mounted on the respective one of the pair of vertical supports.

13. A vehicle snow removal system, comprising:
- a pair of vertical supports, each of the supports having an upper end and a lower end, the lower ends being adapted for mounting on a support surface, the pair of vertical supports being laterally spaced apart from one another so that a vehicle may drive therebetween;
- a horizontal support having a pair of laterally opposed ends, each of the ends being mounted on the respective upper end of one of the vertical supports;
- at least one blower mounted substantially centrally on the horizontal support;
- means for actuating the at least one blower; and
- at least one shield mounted to the pair of vertical supports to block snow blown by the at least one blower from a flat surface of the vehicle.

14. The vehicle snow removal system as recited in claim 13, wherein said means for actuating said at least one blower comprises an optical sensor for detecting the vehicle's proximity.

15. The vehicle snow removal system as recited in claim 13, further comprising an alarm in communication with said means for actuating said at least one blower to provide an alert of the actuation of said at least blower.

\* \* \* \* \*